United States Patent [19]

Canova et al.

[11] Patent Number: 4,968,755
[45] Date of Patent: Nov. 6, 1990

[54] IMIDIZED ACRYLIC POLYMERS AND PROCESS FOR THEIR PREPARATION

[75] Inventors: Luciano Canova, Novara; Umberto Giannini, Milan; Enrico Albizzati, Novara, all of Italy

[73] Assignee: Vedril S.p.A., Milan, Italy

[21] Appl. No.: 143,321

[22] Filed: Jan. 13, 1988

[30] Foreign Application Priority Data

Jan. 14, 1987 [IT] Italy .................. 19065 A/87

[51] Int. Cl.$^5$ ............................................. C08F 8/32
[52] U.S. Cl. .............................. 525/330.4; 525/329.8; 525/329.9; 525/330.5; 525/351; 525/379; 525/382
[58] Field of Search ............... 525/330.5, 330.4, 327.6, 525/329.8, 324.9

[56] References Cited

U.S. PATENT DOCUMENTS

| | | |
|---|---|---|
| 3,370,046 | 2/1968 | Wagner et al. |
| 3,557,066 | 1/1971 | Cohen et al. .................. 525/327.6 |
| 3,578,641 | 5/1971 | Johnson ........................ 525/327.6 |
| 3,875,114 | 4/1975 | Swiger . |
| 4,065,435 | 12/1977 | Sakaguchi et al. ............ 525/327.6 |
| 4,399,263 | 8/1983 | Brodoway ..................... 525/327.6 |
| 4,731,095 | 3/1988 | Garapon et al. .............. 525/327.6 |

FOREIGN PATENT DOCUMENTS 1411536 2/1968 France .

Primary Examiner—Bernard Lipman
Attorney, Agent, or Firm—Morgan & Finnegan

[57] ABSTRACT

Imidized acrylic polymers obtained by means of the reaction of an acrylic resin in the molten state, with at least one modifying agent having the general formula:

$$R-X-NH-R' \qquad (I)$$

wherein:
R and R' are either equal to, or different from, each other and represent hydrogen or an alkyl, cycloalkyl; aryl or alkylaryl radical containing from 1 to 20 carbon atoms, and
X is a bifunctional radical selected from the group consisting of: $-CO-$, $-CONH-$, $-NHCO-$, $-OCO-$, $-SO_2-$, $-C_6H_4SO_2-$.

4 Claims, No Drawings

IMIDIZED ACRYLIC POLYMERS AND PROCESS FOR THEIR PREPARATION

DESCRIPTION OF THE INVENTION

The present invention relates to imidized acrylic polymers, and to a process for preparing the polymers.

The term "acrylic polymers" or "acrylic resins", as used in the present disclosure, and in the appended claims, is defined as homopolymers and copolymers of alkyl esters of methacrylic or acrylic acid, wherein the alkyl group contains from 1 to 8 carbon atoms.

Examples of esters of methacrylic acid or acrylic acid are: methyl methacrylate, ethyl methacrylate, isopropyl methacrylate, sec.-butyl methacrylate, tert.-butyl methacrylate, methyl, ethyl, butyl, isopropyl acrylate, and so forth.

The acrylic polymers, or acrylic resins, can contain units derived from other ethylenically unsaturated monomers, such as styrene, α-methyl-styrene, acrylonitrile, acrylamide, etc., or from monomers containing double ethylenic unsaturation, for example, butadiene.

Said polymers, furthermore, have intrinsic viscosity values, determined in tetrahydrofuran (THF) at 30° C., comprised within the range of from about 0.01 to 7 dl/g, preferably comprised within the range of from about 0.2 to 2 dl/g.

The main drawback shown by these polymers is a low glass transition temperature which significantly limits their use.

From the disclosures of U.S. Pat. No. 3,284,425 and U.K. Patent No. 926,629, it is known to increase the Tg of these polymers by imidization, obtained by means of reaction with ammonium hydroxide, ammonium phosphate or alkyl-amines, or by means of the partial reaction of the same acrylic resin with ammonium hydroxide, followed by the reaction with an alkylamine.

Such processes show several drawbacks: in fact, the processes are carried out in an autoclave, are of the batch type, require heating and reaction times which are generally very long, and require the use of dissolving or suspending solvents.

In order to overcome these drawbacks, as disclosed in German Patent No. 1,077,872, a process was proposed for the preparation of acrylic polymers imidized in an extruder, by using ammonium hydroxide in an aqueous phase. The product obtained however has a poor thermal stability, and requires further treatments before it can be used in transformation processes.

In U.S. Pat. No. 4,246,374, a process is disclosed for the preparation of acrylic polymers imidized in an extruder, by means of the direct reaction of the acrylic resin with ammonia, or a primary amine, under substantially anhydrous conditions. The product obtained shows good thermal stability, but the process conditions for preparing the product are particularly burdensome. For example, the process is operated at temperatures of up to 450° C., and pressures of up to 1,000 atm.

The present applicant has now found, and this is the object of the present invention, that the above-mentioned drawbacks can be overcome by preparing imidized acrylic polymers by means of the reaction of an acrylic resin with at least one modifying agent having the general formula:

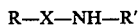

$$R-X-NH-R' \qquad (I)$$

wherein:
R and R' are either equal to, or different from, each other, and represent hydrogen or an alkyl, cycloalkyl, aryl or alkylaryl radical containing from 1 to 20 carbon atoms, and
X is a bifunctional radical selected from the group consisting of: —CO—, —CONH—, —NHCO—, —OCO—, —SO$_2$—, —C$_6$H$_4$SO$_2$—.

In the case where R and R' differ, the former can contain heteroatoms such as the halogens.

Examples of modifying agents having the general formula (I) are: acetamide, anisamide, benzamide, acetanilide, butyramide, benzanilide, propionamide, formamide, N-methyl-acetamide, N-methyl-benzamide, N-methyl-formamide, N-phenyl formamide, benzenesulphamide, ethyl carbamate, benzhydrazide, chloropropionamide, N, N'-dimethylurea and so forth.

The imidized acrylic polymers obtained by means of the process of the present invention have an optimum thermal stability, and an intrinsic viscosity in tetrahydrofuran (THF) at 30° C. comprised within the range of from about 0.01 to 7 dl/g, and preferably from about 0.2 to 2 dl/g, a nitrogen content comprised within the range of from about 0.1 to 9% by weight, preferably of from about 0.5 to 7% by weight, and a content of imidic units at least equal to 5% relative to the theoretical maximum value.

On the basis of I.R. analysis, it is deduced that these imidic units are cyclic, even if such a structure is not binding for the purposes of the present invention.

A method for preparing the imidized acrylic polymers according to the present invention comprises reacting an acrylic resin, and the modifying agent of formula (I) under ambient pressure, or, preferably, under a pressure lower than ambient pressure, and at a temperature higher than the melting temperature of the acrylic resin.

Reaction pressures are comprised within the range of from 760 and 10$^{-2}$ torr, preferably of from 500 to 0.1 torr and most preferably of 750 torr. Reaction temperatures are comprised within the range of from 200° to 350° C., preferably of from 220° to 280° C., which are the most commonly used temperatures.

The modifying agent is used in amounts comprised within the range of from about 5 to 60 mol percent, and preferably of from about 10 to 50 mol percent, relative to the acrylic monomer unit.

According to a preferred form and a practical embodiment of the process of the present invention, the reaction between the acrylic resin and the modifying agent having formula (I) is carried out in the presence of basic catalysts, acidic catalysts and/or transesterification catalysts.

Such catalysts are high-boiling products which are stable under the reaction conditions; they can be preferably selected from the group consisting of tertiary amines, such as dicyclohexyl-amine, 1,1,3,3-tetramethyl-guanidine, 1,3-diphenylguanidine, quinoline, isoquinoline, 4-benzylpyridine, 4-phenylpyridine, 2,3-benzodiazine, 1,4-benzodiazine, 1-benzazine, 1,3-benzodiazine, N,N'-dicyclohexyl-carbodiimide, 2,2'-bipyridyl, 2,3'-bipyridyl, 2,4'-bipyridyl or such catalyst can be selected from the group consisting of HCl, Sb$_2$O$_3$, Ti-(OC$_4$H$_9$)$_4$, NaNH$_2$, SnO$_2$, potassium or sodium alkoxides, manganese acetate, and so forth.

The catalysts can be used in amounts which can be as high as 30% by weight, relative to the total amount of the reaction mixture.

According to a further preferred form of a practical embodiment of the process of the present invention, the reaction between the acrylic resin and the modifying agent, having the general formula (I), can also be carried out in an extruder, in a mixer, or in similar apparatuses suitably equipped with degassing devices.

The process of the present invention can be carried out by using the acrylic resin both in the molten state, and dissolved in a suitable solvent.

The imidized acrylic polymers of the present invention can be processed by commonly used technologies for the transformation of thermoplastic polymers. Such processes include, for example, extrusion, injection-molding, etc.. The polymer can be used for the production of manufactured articles of any shapes and/or dimensions. Furthermore, such polymers can be used in the preparation of sheets, films, tubes, filaments, and so forth.

The imidized acrylic polymers obtained at the end of the process according to the present invention can be blended with suitable additives, such as, for example, impact-resistant products, pigments, fibers, mineral fillers, flame retarding agents, stabilizers, lubricants, plastifiers, and so forth.

Foaming agents can be added to the polymers according to the present invention, and the polymers can be used in the foamed form, possibly further blended with fibers and/or inorganic fillers in order to produce manufactured articles endowed with low density and high mechanical properties.

The glass transition temperature (Tg) is determined by using a differential calorimeter, and this is the temperature corresponding to the point of the inflection in the temperature chart, when the heat capacity of the material changes. The temperature change rate is 20° C./minute, and the measurement is carried out by heating up to 200° C., with subsequent cooling.

In order to better understand the present invention the foolowing illustrative examples are presented, but the examples are not intended to limit the scope of the invention.

EXAMPLE 1

To a glass reactor, equipped with stirrer and vent port for the volatile components, 25 g of a copolymer containing 98% by weight of methyl methacrylate and 2% by weight of methyl acrylate, having an intrinsic viscosity in THF at 30° C. of 0.34 dl/g; and 15 g of benzamide are simultaneously charged under a nitrogen atmosphere. The reaction mass is gradually heated to the melting temperature, and then to 255° C. The volatile reaction products are distilled off and removed.

The reaction is maintained at 255° C. for approximately 3 hours, then the reactor is evacuated by a mechanical pump for 15 minutes. The reaction mass is cooled to 150° C. and it is refluxed with nitrogen; the reaction product is diluted with 50 ml of N,N'-dimethylformamide, to obtain a solution from which the polymer is recovered by coagulation with methanol.

The product polymer is filtered, washed with ether and vacuum-dried.

The polymer has an intrinsic viscosity in THF of 0.3 dl/g, a nitrogen content of 3.7% by weight, and a glass transition temperature (Tg)=155° C.

Furthermore, the polymer, submitted to thermogravimetric analysis (TGA), carried out by submitting the sample to a temperature increase rate of 10° C./minute, under a nitrogen atmosphere, shows a weight loss of 0.45% within the temperature range of from 50° to 300° C.

The I.R. spectroscopy, carried out on the product, evidenced the presence of absorption bands at 1,698 cm$^{-1}$ and at 3,240 cm$^{-1}$, which could be presumably attributed to a cyclic imidic structure of the type:

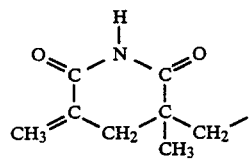

EXAMPLE 2

The reaction is carried out according to the procedure of Example 1, except 0.2 ml of 4-benzyl-pyridine is added to the reaction mixture simultaneously with benzamide and the copolymer.

The product polymer has an intrinsic viscosity in THF of 0.28 dl/g, a nitrogen content of 2.9% by weight, and a Tg=160° C.

EXAMPLE 3

The reaction is carried out according to the procedure of Example 1, but 8 ml of 4-benzyl-pyridine are added simultaneously with benzamide and the copolymer, and the reaction is carried out at 230° C.

The product polymer has an intrinsic viscosity in THF of 0.28 dl/g, a nitrogen content of 6.2% by weight, and a Tg=183° C.

EXAMPLE 4

The reaction is carried out according to the procedure of Example 1, with benzamide being replaced with 18 g of anisamide, and the reaction being carried out at 280° C.

The product polymer has an intrinsic viscosity of 0.29 dl/g, a nitrogen content of 2.33% by weight, and a Tg=133° C.

EXAMPLE 5

The reaction is carried out according to the procedure of Example 1, with benzamide being replaced with 7.3 g of acetamide, and the reaction being carried out at 222° C.

The product polymer has an intrinsic viscosity of 0.34 dl/g, a nitrogen content of 0.84% by weight, and a Tg=124° C.

EXAMPLE 6

The reaction is carried out according to the procedure as set forth in Example 5, but 1 ml of 4-benzyl-pyridine is added simultaneously with benzamide and the copolymer, and the reaction is carried out at 228° C.

The product polymer has an intrinsic viscosity of 0.28 dl/g, a nitrogen content of 2.39% by weight, and a Tg=149° C.

EXAMPLE 7

The reaction is carried out according to the procedure of Example 1, with benzamide being replaced with 16.2 g of acetamide, and the reaction being carried out at 273° C.

The product polymer has an intrinsic viscosity of 0.31 dl/g, a nitrogen content of 0.52% by weight, and a Tg=131° C.

EXAMPLE 8

The reaction is carried out according to the procedure of Example 1, with an acrylic resin being used, which is comprised of 90% by weight of methyl-methacrylate and 10% by weight of ethyl acrylate, having an intrinsic viscosity in chloroform at 23° C. of 0.45 dl/g.

The product polymer has a nitrogen content of 3% by weight, and a Tg=148° C.

EXAMPLE 9

The reaction is carried out according to the procedure of Example 1, with an acrylic resin being used, which is comprised of 65% by weight of methyl-methacrylate and 35% by weight of styrene, with an intrinsic viscosity in chloroform at 23° C. of 0.7 dl/g. The product polymer has a nitrogen content of 2% by weight, and a Tg=139° C.

EXAMPLE 10

The reaction is carried out according to the procedure of Example 1, with benzamide being replaced with 15 gr. of N-phenyl formamide. The product polymer has a Tg=170° C.

EXAMPLE 11

The reaction is carried out according to the procedure of Example 1, with the following differences: benzamide is replaced with 13 gr of chloroproprionamide and the methyl methacrylate/methyl acrylate copolymer has an intrinsic viscosity of 0.9 dl/g. The product polymer has a Tg=175° C.

What is claimed is:

1. Imidized acrylic polymers obtained by means of the reaction of acrylic polymers, selected from the group consisting of homopolymers and copolymers of alkyl esters of methacrylic or acrylic acid wherein the alkyl group contains from 1 to 8 carbon atoms, possibly said acrylic polymers containing units derived from other ethylenically unsaturated monomers selected from the group consisting of styrene, α-methylstyrene, acrylonitrile, acrylamide or from monomers containing double ethylenic unsaturation, with at least one modifying agent having the general formula:

$$R-X-NH-R' \qquad (I)$$

wherein:
R and R' are either equal to or different from each other, and represent hydrogen or an alkyl, cycloalkyl, aryl or alkylaryl radical containing from 1 to 20 carbon atoms, and
X is a bifunctional radical selected from the group consisting of: —CO—, —CONH—, —NHCO—, —OCO—, —SO$_2$—, C$_6$H$_4$SO$_2$— where R and R' differ, the former can contain halogen atoms.

2. Imidized acrylic polymers according to claim 1, wherein the modifying agents having the general formula (I) comprise at least one member selected from the group consisting of: benzamide, anisamide, acetamide, acetanilide, butyramide, benzanilide, propionamide, formamide, N-methylacetamide, N-methyl-benzamide, N-methyl-formamide, N-phenyl formamide, benzenesulphamide, ethyl carbamate, benzhydrazide and chloropropionamide, N, N'-dimethylurea.

3. Imidized acrylic polymers according to claim 1, having an optimum thermal stability, an intrinsic viscosity in tetrahydrofuran (THF) at 30° C. comprised within the range of from about 0.01 to 7 dl/g; a nitrogen content comprised within the range of from 0.1 to 9% by weight, and a content of imidic units at least equal to 5% relatively to the theoretical maximum value.

4. Imidized acrylic polymers according to claim 2, having an optimum thermal stability, an intrinsic viscosity in tetrahydrofuran (THF) at 30° C. comprised within the range of from 0.02 to 2 dl/g; a nitrogen content comprised within the range of from 0.5 to 7% by weight, and a content of imidic units at least equal to 5% relatively to the theoretical maximum value.

* * * * *